(12) United States Patent
Kang et al.

(10) Patent No.: US 8,724,225 B2
(45) Date of Patent: May 13, 2014

(54) OPTICAL SYSTEM FOR USE IN A VEHICLE HEAD-UP DISPLAY

(75) Inventors: Weon Eui Kang, Gyeonggi-Do (KR);
Byeong Sup Moon, Gyeonggi-Do (KR);
Bum Jin Park, Gyeonggi-Do (KR);
Hyuk Kyu Lim, Gyeonggi-Do (KR);
Seok Jae Choi, Incheon-Si (KR)

(73) Assignees: Korea Institute of Construction Technology, Gyeonggi-Do (KR); V & I Co., Ltd, Gyeonggi-Do (KR)

( * ) Notice: Subject to any disclaimer, the term of this patent is extended or adjusted under 35 U.S.C. 154(b) by 76 days.

(21) Appl. No.: 13/093,768

(22) Filed: Apr. 25, 2011

(65) Prior Publication Data

US 2012/0188652 A1 Jul. 26, 2012

Related U.S. Application Data

(60) Provisional application No. 61/436,516, filed on Jan. 26, 2011.

(51) Int. Cl.
*G02B 27/14* (2006.01)
*G09G 5/00* (2006.01)

(52) U.S. Cl.
USPC .............................. 359/630; 345/7

(58) Field of Classification Search
USPC .................. 359/630–632; 345/7–9
See application file for complete search history.

(56) References Cited

U.S. PATENT DOCUMENTS 3,620,592 A * 11/1971 Freeman .................. 359/631
2001/0027125 A1* 10/2001 Kiyomatsu et al. ............ 345/7

* cited by examiner

*Primary Examiner* — Alicia M Harrington
(74) *Attorney, Agent, or Firm* — Patent Law Group LLP; David C. Hsia

(57) ABSTRACT

An optical system is provided for use in a vehicle head-up display including a display panel for displaying drive information image, a backlight unit for irradiating light toward the display panel and an optical system for adjusting the size and focal distance of the drive information image projected from the display panel toward a windshield of a motor vehicle. The optical system includes a pre-lens reflection mirror array for reflecting the drive information image projected from the display panel to travel along a first roundabout path, a lens array for adjusting the size and focal distance of the drive information image reflected by the pre-lens reflection mirror array, and a post-lens reflection mirror array for reflecting the drive information image coming from the display panel toward the windshield to travel along a second roundabout path.

1 Claim, 4 Drawing Sheets

OPTICAL SYSTEM FOR USE IN A VEHICLE HEAD-UP DISPLAY

CROSS-REFERENCE TO RELATED APPLICATION

This application claims the benefit of U.S. Provisional Patent Application Ser. No. 61/436,516, filed on Jan. 26, 2011, which application is incorporated herein by reference in its entirety.

FIELD OF THE INVENTION

The present invention relates to an optical system for use in a vehicle head-up display, capable of enhancing the definition and discrimination of a drive information image formed on the windshield of a motor vehicle.

BACKGROUND OF THE INVENTION

In recent years, various kinds of devices have been developed in an effort to enhance the driver's convenience and the safe driving. One example of such devices is a head-up display (HUD) for motor vehicles. The head-up display is designed to display a variety of drive information, e.g., a vehicle speed, a revolution per minute and a residual fuel amount, on the windshield of a vehicle.

A flat-panel-type head-up display is primarily used as the head-up display for motor vehicles. Referring to FIG. 1, the flat-panel-type head-up display includes a flat display panel 10 and a backlight unit 12 arranged at the rear side of the display panel 10. The display panel 10 may be one of a liquid crystal display, a liquid-crystal-on-silicon display, a digital micro-mirror display, a thin-film-transistor display and an organic electroluminescence display. The display panel 10 is installed inside of an instrument panel 10a in front of a driver seat so that it can display a drive information image. The backlight unit 12 may be composed of an ultra-high-pressure lamp, a light emitting diode or a laser, and serves as a light source for irradiating light on the rear surface of the display panel 10.

The head-up display further includes an optical system 14 arranged at the front side of the display panel 10. The optical system 14 includes at least one lens 16 positioned at the front side of the display panel 10 and a reflection mirror 18 installed at the front side of the lens 16 at a specified angle. The lens 16 causes the drive information image projected from the display panel 10 to converge or diverge on the reflection mirror 18. The reflection mirror 18 reflects the drive information image coming from the lens 16 toward a windshield 19 so that the drive information image can be displayed on the windshield 19.

Since the head-up display is designed to display a variety of drive information on the windshield 19, it is possible for a driver to readily recognize the vehicle drive information without having to look at the instrument panel 10a.

In the conventional head-up display, however, the distance L between the display panel 10 and the lens 16 is too short. This poses a problem in that the depth of the drive information image appearing on the windshield 19 becomes too small, which in turn impairs the definition and discrimination of the drive information image observed by a driver. The depth and definition of the drive information image appearing on the windshield 19 can be improved as the distance L between the display panel 10 and the lens 16 increases.

Due to the short distance between the display panel 10 and the lens 16 and the reduced depth of the drive information image, the conventional head-up display suffers from an out-of-focusing phenomenon that the most part of the drive information image other than a particular area looks dim and unclear. This tends to sharply reduce the definition and discrimination of the drive information image.

As a solution to this problem, it would be thinkable to increase the distance L between the display panel 10 and the lens 16. In this case, however, the size of the head-up display becomes too big, consequently making it difficult to install the head-up display within the instrument panel 10a.

SUMMARY OF THE INVENTION

In view of the problems inherent in the prior art, it is an object of the present invention to provide an optical system for use in a vehicle head-up display, capable of increasing the distance between a display panel and a lens with no increase in the size of the head-up display.

Another object of the present invention is to provide an optical system for use in a vehicle head-up display, capable of increasing the depth of a drive information image formed on a windshield of a motor vehicle to thereby enhance the definition and discrimination of the drive information image.

In accordance with the present invention, there is provided an optical system for use in a vehicle head-up display including a display panel for displaying drive information image, a backlight unit for irradiating light toward the display panel and an optical system for adjusting the size and focal distance of the drive information image projected from the display panel toward a windshield of a motor vehicle. The optical system includes: a pre-lens reflection mirror array for reflecting the drive information image projected from the display panel to travel along a first roundabout path; a lens array for adjusting the size and focal distance of the drive information image reflected by the pre-lens reflection mirror array; and a post-lens reflection mirror array for reflecting the drive information image coming from the display panel toward the windshield to travel along a second roundabout path.

In the optical system, the pre-lens reflection mirror array may include a first pre-lens reflection mirror for reflecting the drive information image projected from the display panel, a second pre-lens reflection mirror for reflecting the drive information image reflected by the first pre-lens reflection mirror and a third pre-lens reflection mirror for reflecting the drive information image reflected by the second pre-lens reflection mirror toward the lens array.

In the optical system, the first pre-lens reflection mirror may be arranged to reflect the drive information image at an angle of 85° to 95° with respect to the display panel, the second pre-lens reflection mirror being arranged to reflect the drive information image at an angle of 85° to 95° with respect to the first pre-lens reflection mirror, the third pre-lens reflection mirror being arranged to reflect the drive information image at an angle of 85° to 95° with respect to the second pre-lens reflection mirror.

In the optical system, the post-lens reflection mirror array may include a first post-lens reflection mirror for reflecting the drive information image coming from the lens array and a second post-lens reflection mirror for reflecting the drive information image reflected by the first post-lens reflection mirror toward the windshield.

In the optical system, the first post-lens reflection mirror may be arranged to reflect the drive information image upwards at an angle of 85° to 95° with respect to the lens array.

In the optical system, the second post-lens reflection mirror may be coated with an anti-reflective film.

In the optical system, the second pre-lens reflection mirror may be arranged in a substantially-parallel opposing relationship with the first pre-lens reflection mirror, the third pre-lens reflection mirror being arranged in an inclined opposing relationship with the second pre-lens reflection mirror.

With the optical system of the present invention, the drive information image projected from the display panel is reflected many times by the first through third pre-lens reflection mirrors to travel an extended distance before it reaches the lens array. This makes it possible to increase the effective length between the display panel and the lens array without having to arrange the display panel and the lens array far away from each other. Consequently, it is possible to increase the depth of the drive information image formed on the windshield and to enhance the definition and discrimination of the drive information image.

In addition, the drive information image adjusted by the lens array is reflected many times by the first and second post-lens reflection mirrors to travel an extended distance before it reaches the windshield. This makes it possible to increase the focal length between the lens array and the windshield without having to arrange the lens array and the windshield far away from each other. As a consequence, it is possible to increase the depth of the drive information image formed on the windshield and to enhance the definition and discrimination of the drive information image.

BRIEF DESCRIPTION OF THE DRAWINGS

The above and other objects and features of the present invention will become apparent from the following description of preferred embodiments, given in conjunction with the accompanying drawings.

DETAILED DESCRIPTION OF THE PREFERRED EMBODIMENTS

Figure 1:
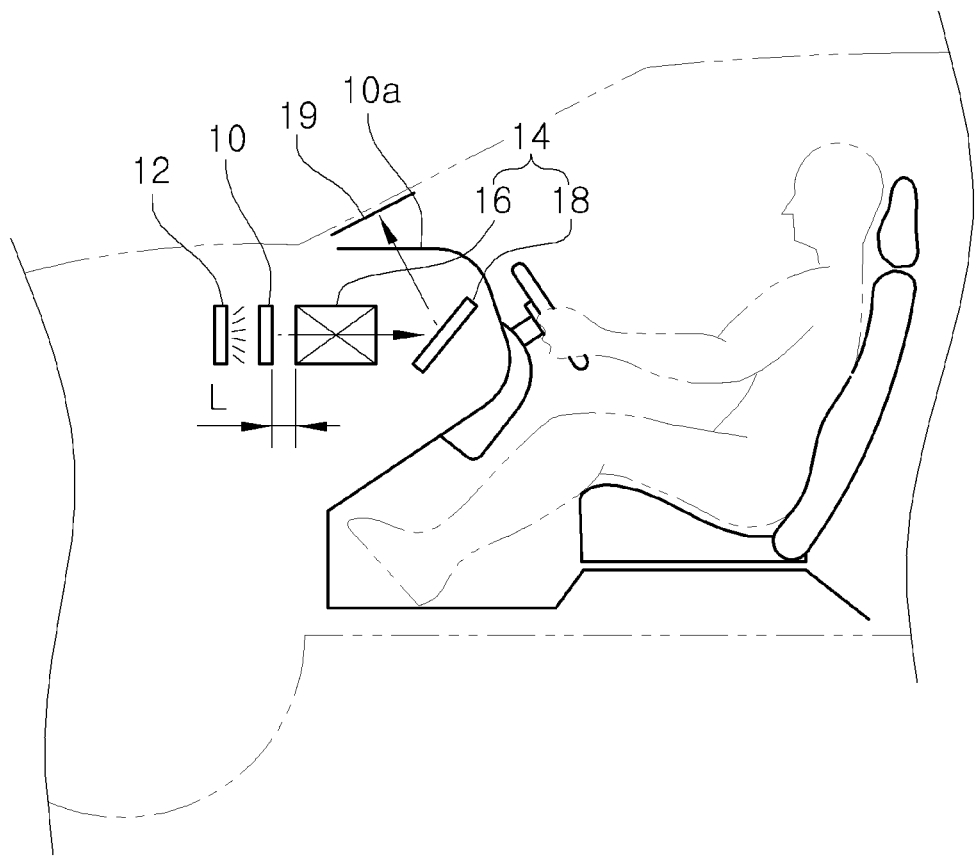
FIG. 1 is a view schematically showing a conventional optical system for use in a vehicle head-up display.

One preferred embodiment of an optical system for use with a vehicle head-up display will now be described in detail with reference to the accompanying drawings. The same components as those of the conventional head-up display shown in FIG. 1 will be designated by the same reference numerals.

Brief description on a vehicle head-up display will precede the description of the optical system for use in a vehicle head-up display according to one embodiment of the present invention.

As described earlier in connection with FIG. 1, the vehicle head-up display includes a display panel 10 and a backlight unit 12 arranged at the rear side of the display panel 10. The display panel 10 is installed inside of an instrument panel 10a in front of a driver seat so that it can display a drive information image. The backlight unit 12 serves as a light source for irradiating light on the rear surface of the display panel 10. The display panel 10 may be one of a liquid crystal display, a liquid-crystal-on-silicon display, a digital micro-mirror display, a thin-film-transistor display and an organic electroluminescence display.

The vehicle head-up display includes an optical system 20 arranged at the front side of the display panel 10. The optical system 20 serves to enlarge or reduce the drive information image appearing on the display panel 10 and to adjust the focal distance of the drive information image. The drive information image is reflected toward the windshield 19 by the optical system 20.

Figure 2:
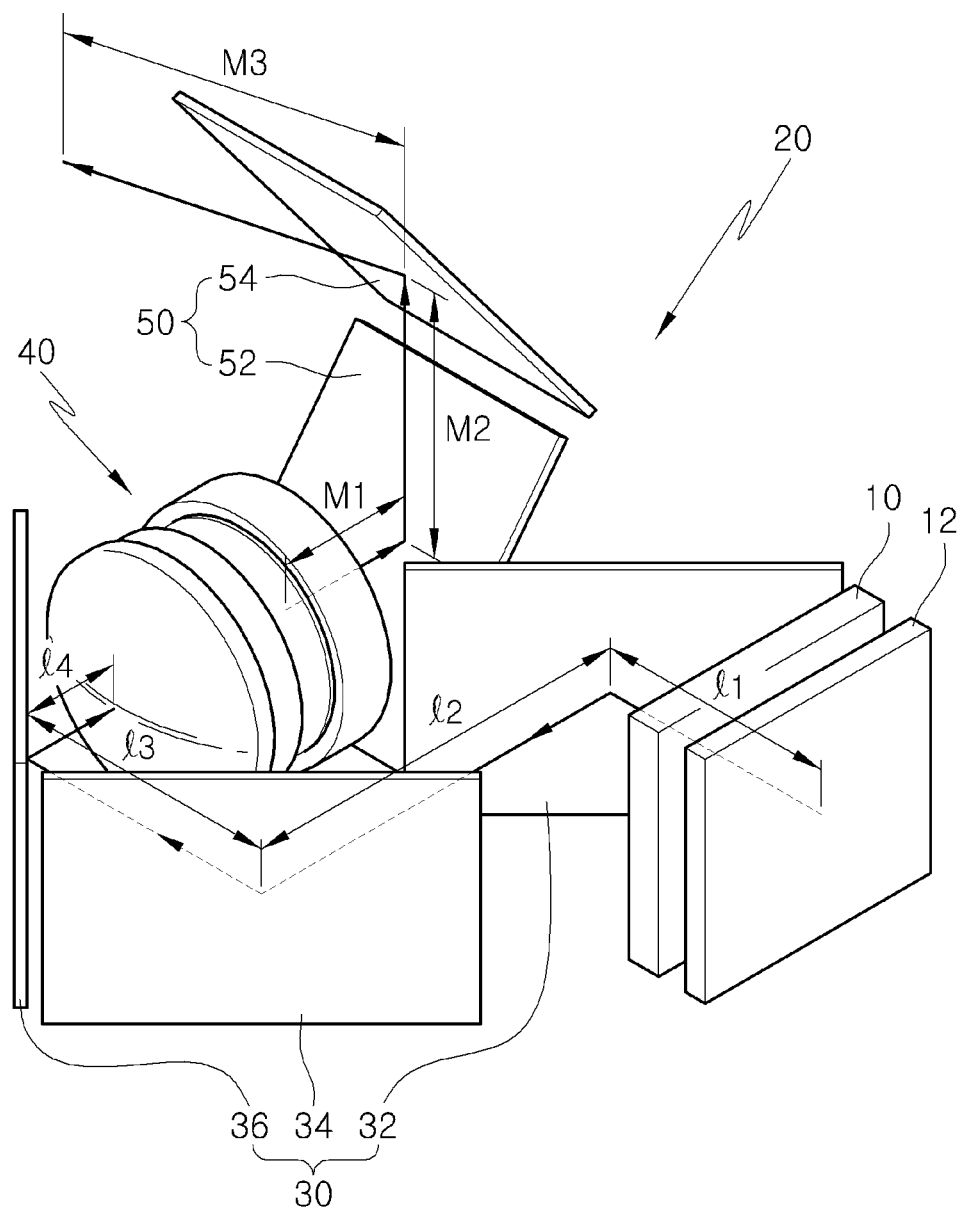
FIG. 2 is a perspective view schematically showing an optical system for use in a vehicle head-up display in accordance with one embodiment of the present invention.
Figure 3:
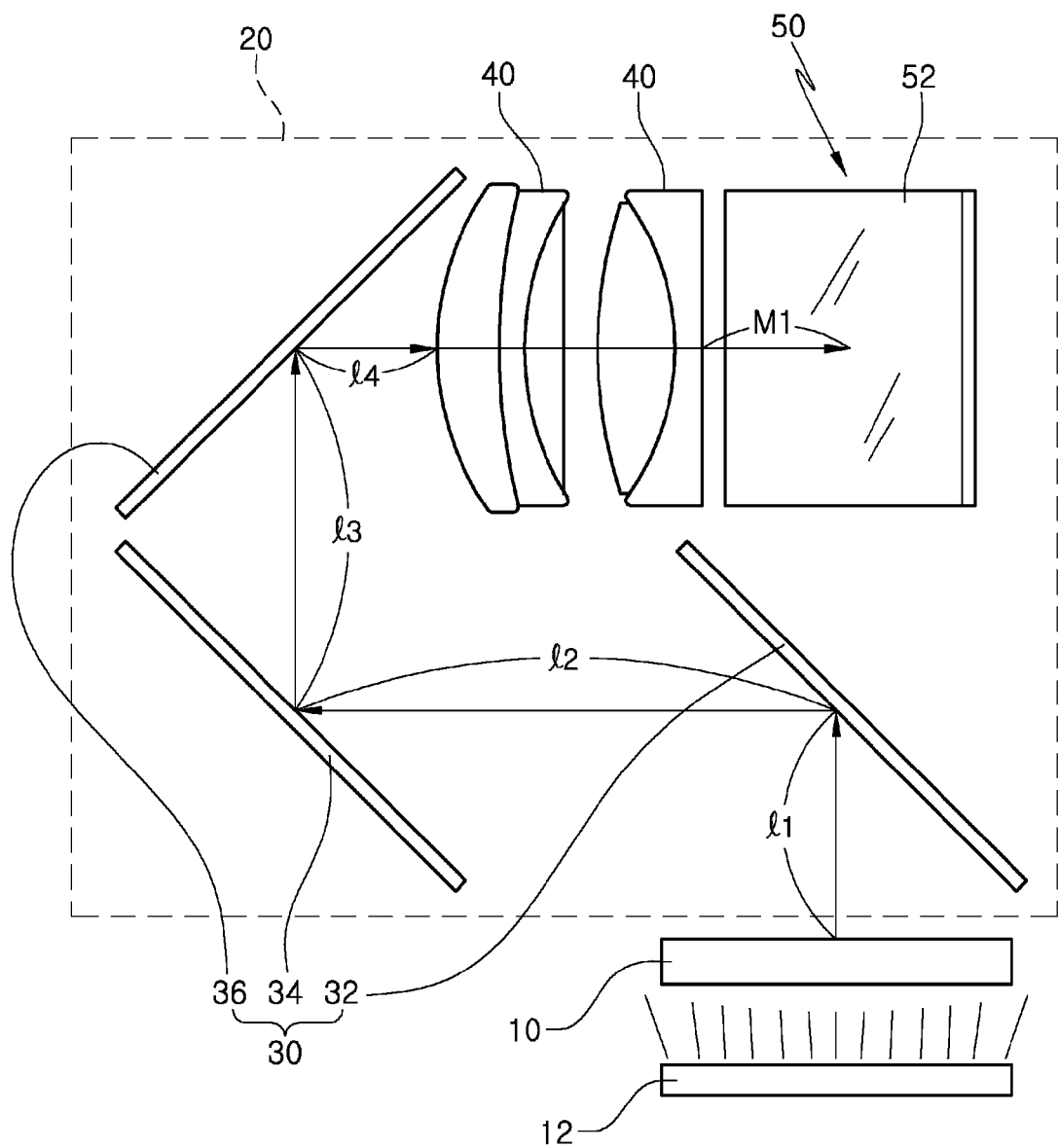
FIG. 3 is a plan view of the present optical system for use in a vehicle head-up display shown in FIG. 2.
Figure 4:
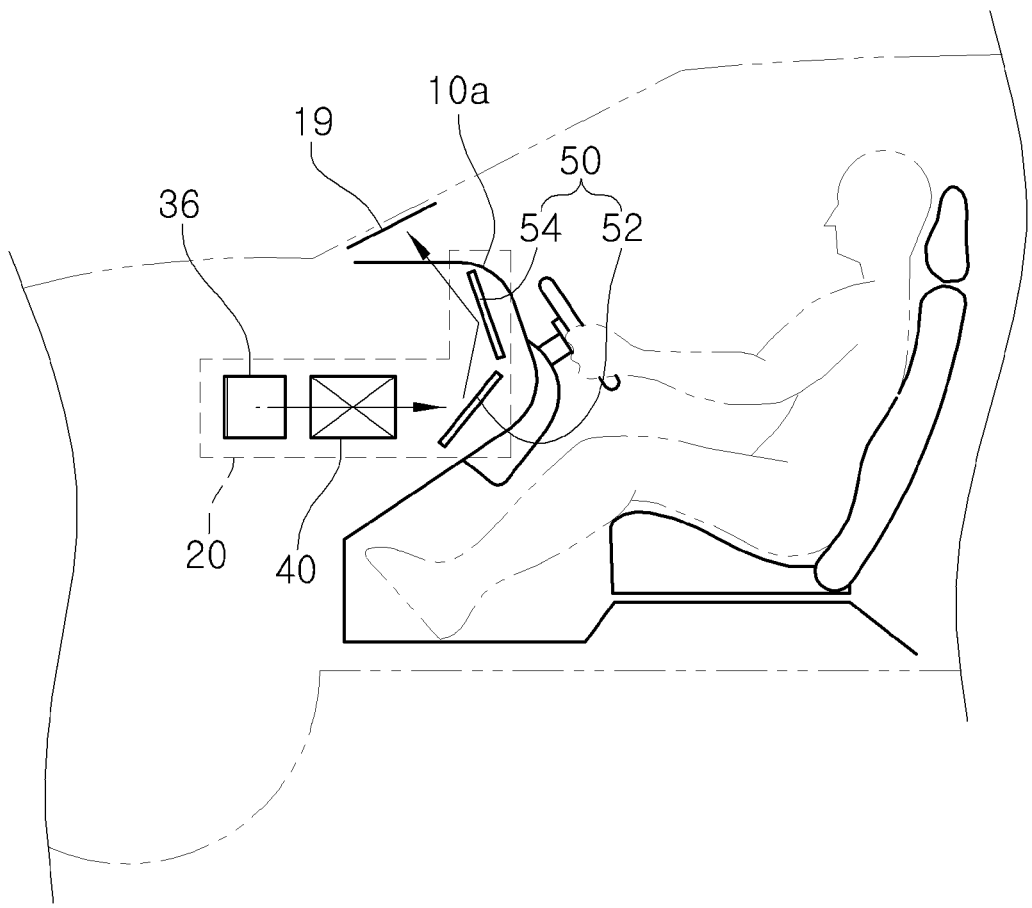
FIG. 4 is a view showing the present optical system for use in a vehicle head-up display installed in a motor vehicle.

Referring to FIGS. 2 through 4, the optical system 20 for use in a vehicle head-up display includes a pre-lens reflection mirror array 30 for reflecting the drive information image projected from the display panel 10 to travel along a first roundabout path. The pre-lens reflection mirror array 30 includes a first pre-lens reflection mirror 32 arranged in front of the display panel 10, a second pre-lens reflection mirror 34 arranged in an substantially-parallel opposing relationship with the first pre-lens reflection mirror 32 and a third pre-lens reflection mirror 36 arranged in an inclined opposing relationship with the second pre-lens reflection mirror 34.

The first pre-lens reflection mirror 32 is arranged at an angle of about 40° to 50° with respect to the display panel 10 to reflect the drive information image projected from the display panel 10 toward the second pre-lens reflection mirror 34 at an angle of about 85° to 95°. The first pre-lens reflection mirror 32 may have a completely planar reflection surface or a concave or convex reflection surface. In other words, the first pre-lens reflection mirror 32 may employ various kinds of reflection surfaces to correct image distortion which may occur depending on the image projection angle or image projection distance with respect to the windshield 19.

The second pre-lens reflection mirror 34 is arranged parallel to the first pre-lens reflection mirror 32 at the same inclination angle as that of the first pre-lens reflection mirror 32. The second pre-lens reflection mirror 34 thus arranged reflects the drive information image coming from the first pre-lens reflection mirror 32 at an angle of about 90°. The second pre-lens reflection mirror 34 may have a completely planar reflection surface or a concave or convex reflection surface.

The third pre-lens reflection mirror 36 is arranged at an angle of about 85° to 95° with respect to the second pre-lens reflection mirror 34 to reflect the drive information image coming from the second pre-lens reflection mirror 34 toward a lens array 40 at an angle of about 85° to 95°. The third pre-lens reflection mirror 36 may have a completely planar reflection surface or a concave or convex reflection surface.

Referring again to FIGS. 2 through 4, the present optical system 20 further includes a lens array 40 for adjusting the size and focal distance of the drive information image coming from the pre-lens reflection mirror array 30 in a distortion-free manner. The lens array 40 is a combination of concave and convex lenses. The lens array 40 optimizes the size and focal distance of the drive information image appearing on the windshield 19 by adjusting the size and focal distance of the drive information image coming from the pre-lens reflection mirror array 30 in a distortion-free manner.

The present optical system 20 further includes a post-lens reflection mirror array 50 for reflecting the drive information image coming from the lens array 40 toward the windshield 19 to travel along a second roundabout path. The post-lens reflection mirror array 50 includes a first post-lens reflection mirror 52 arranged in front of the lens array 40 and a second post-lens reflection mirror 54 arranged in an inclined opposing relationship with the first post-lens reflection mirror 52.

The first post-lens reflection mirror 52 is arranged at an angle of about 40° to 50° with respect to the lens array 40 to reflect the drive information image coming from the lens array 40 toward the second post-lens reflection mirror 54 at an angle of about 85° to 95°. The first post-lens reflection mirror 52 may have a completely planar reflection surface or a concave or convex reflection surface.

The second post-lens reflection mirror 54 is arranged at an angle of about 40° to 60° with respect to the first post-lens reflection mirror 52 to reflect the drive information image coming from the first post-lens reflection mirror 52 toward the windshield 19. The angle of the second post-lens reflection mirror 54 depends on the angle of the windshield 19 which differs from vehicle to vehicle. The second post-lens reflection mirror 54 may have a completely planar reflection surface or a concave or convex reflection surface. By just looking at the drive information image appearing on the windshield 19, the driver can readily obtain a variety of drive information needed in driving a motor vehicle.

It is preferred that an anti-reflective film be coated on the reflection surface of the second post-lens reflection mirror 54. This is to increase the planarity of the drive information image reflected toward the windshield 19 and to prevent external light from being incident upon the second post-lens reflection mirror 54 and entering the lens array 40 backwards. By coating the reflection surface of the second post-lens reflection mirror 54 with the anti-reflective film, it is possible to cut off unnecessary external light, which helps enhance the definition of the drive information image appearing on the windshield 19. The anti-reflective film is well-known in the art and therefore will not be described in more detail.

Next, the operation of the present optical system 20 configured as above will be described with reference to FIG. 2 through 4.

The drive information image displayed on the display panel 10 is projected toward the first pre-lens reflection mirror 32 by the backlight unit 12 and is then reflected toward the second pre-lens reflection mirror 34 by the first pre-lens reflection mirror 32 at an angle of about 85° to 95°. The second pre-lens reflection mirror 34 reflects the drive information image toward the third pre-lens reflection mirror at an angle of about 85° to 95°. The third pre-lens reflection mirror 36 reflects the drive information image toward the lens array 40.

The drive information image travels along the first roundabout path between the display panel 10 and the lens array 40 as it is reflected by the first through third pre-lens reflection mirrors 32, 34 and 36. As a result, the effective length (l1+l2+l3+l4) between the display panel 10 and the lens array 40 is increased. This helps increase the depth of the drive information image appearing on the windshield 19, thereby improving the definition and discrimination of the drive information image.

The size and focal length of the drive information image is adjusted with no distortion when it passes through the lens array 40. The drive information image thus adjusted is projected toward the first post-lens reflection mirror 52 and then reflected toward the second post-lens reflection mirror 54 by the first post-lens reflection mirror 52 at an angle of about 85° to 95°. The second post-lens reflection mirror 54 reflects the drive information image toward the windshield 19, thus forming the drive information image on the windshield 19 to provide a driver with a wide variety of information required in driving a motor vehicle.

The drive information image travels along the second roundabout path between the lens array 40 and the windshield 19 (or an image formation surface) as it is reflected by the first and second post-lens reflection mirrors 52 and 54. As a result, the focal length (M1+M2+M3) between the lens array 40 and the windshield 19 is increased. This helps increase the depth of the drive information image appearing on the windshield 19, thereby improving the definition and discrimination of the drive information image.

With the present optical system 20 of this configuration, the drive information image projected from the display panel 10 is reflected many times by the first through third pre-lens reflection mirrors 32, 34 and 36 to travel an extended distance before it reaches the lens array 40. This makes it possible to increase the effective length (l1+l2+l3+l4) between the display panel 10 and the lens array 40 without having to arrange the display panel 10 and the lens array 40 far away from each other. Consequently, it is possible to increase the depth of the drive information image formed on the windshield 19 and to enhance the definition and discrimination of the drive information image.

In addition, the drive information image adjusted by the lens array 40 is reflected many times by the first and second post-lens reflection mirrors 52 and 54 to travel an extended distance before it reaches the windshield 19. This makes it possible to increase the focal length (M1+M2+M3) between the lens array 40 and the windshield 19 without having to arrange the lens array 40 and the windshield 19 far away from each other. As a consequence, it is possible to increase the depth of the drive information image formed on the windshield 19 and to enhance the definition and discrimination of the drive information image.

As described above, the pre-lens reflection mirror array 30, the post-lens reflection mirror array 50 and the lens array 40 of the present optical system 20 are arranged so that the drive information image can be reflected many times to travel an extended distance before it reaches the windshield 19. This makes it possible to increase the depth of the drive information image formed on the windshield 19 and to enhance the definition and discrimination of the drive information image. Thus, it is possible for a driver to rapidly and reliably recognize the traffic information, which assists in assuring the safe driving.

While one preferred embodiment of the invention has been described hereinabove, the present invention is not limited thereto. It is to be understood that various changes and modifications may be made without departing from the scope of the invention defined in the claims.

What is claimed is:

1. An optical system for use in a vehicle head-up display including a display panel for displaying drive information image, a backlight unit for irradiating light toward the display panel, and the optical system for adjusting the size and focal distance of the drive information image projected from the display panel toward a windshield of a motor vehicle, the optical system comprising:
   a pre-lens reflection mirror array for reflecting the drive information image projected from the display panel to travel along a first folded path;
   a lens array for adjusting the size and focal distance of the drive information image reflected by the pre-lens reflection mirror array;
   a post-lens reflection minor array for reflecting the drive information image coming from the display panel toward the windshield to travel along a second folded path;
   wherein the pre-lens reflection mirror array comprises a first pre-lens reflection minor for reflecting the drive information image projected from the display panel, a second pre-lens reflection mirror for reflecting the drive information image reflected by the first pre-lens reflection mirror, and a third pre-lens reflection mirror for reflecting the drive information image reflected by the second pre-lens reflection minor toward the lens array;
wherein the second pre-lens reflection mirror is arranged in a substantially parallel opposing relationship with the first pre-lens reflection minor along the first folded path, and the third pre-lens reflection mirror is arranged in an inclined opposing relationship with the second pre-lens reflection mirror;
wherein the first pre-lens reflection mirror is arranged to reflect the drive information image at an angle of 85° to 95° with respect to the display panel, the second pre-lens reflection mirror being arranged to reflect the drive information image at an angle of 85° to 95° with respect to the first pre-lens reflection mirror, the third pre-lens reflection mirror being arranged to reflect the drive information image at an angle of 85° to 95° with respect to the second pre-lens reflection mirror;
wherein the post-lens reflection mirror array comprises a first post-lens reflection mirror for reflecting the drive information image coming from the lens array and a second post-lens reflection mirror for reflecting the drive information image reflected by the first post-lens reflection mirror toward the windshield;
wherein the first post-lens reflection mirror is arranged to reflect the drive information image upwards at an angle of 85° to 95° with respect to the lens array; and
wherein the second post-lens reflection mirror is coated with an anti-reflective film.

\* \* \* \* \*

UNITED STATES PATENT AND TRADEMARK OFFICE
CERTIFICATE OF CORRECTION

PATENT NO. : 8,724,225 B2  
APPLICATION NO. : 13/093768  
DATED : May 13, 2014  
INVENTOR(S) : Weon Eui Kang et al.

Page 1 of 1

It is certified that error appears in the above-identified patent and that said Letters Patent is hereby corrected as shown below:

In the Claims

Column 6  
Line 58, Claim 1, where "minor" should read --mirror--.

Column 6  
Line 63, Claim 1, where "minor" should read --mirror--.

Column 7  
Line 2, Claim 1, where "minor" should read --mirror--.

Column 7  
Line 5, Claim 1, where "minor" should read --mirror--.

Signed and Sealed this  
Twenty-ninth Day of July, 2014

Michelle K. Lee  
*Deputy Director of the United States Patent and Trademark Office*